UNITED STATES PATENT OFFICE 2,692,263

YELLOW SUBSTANTIVE AZO AND AZOXY DYESTUFFS

Karl Taube, Leverkusen-Bayerwerk, Germany, assignor to Farbenfabriken Bayer Aktiengesellschaft, Leverkusen, Germany, a corporation of Germany No Drawing. Application June 25, 1952, Serial No. 295,555

Claims priority, application Germany July 6, 1951

11 Claims. (Cl. 260—154)

The present invention relates to new yellow substantive azo dyestuffs and to a process of making the same; more particularly it relates to azo dyestuffs of the general formula:

R—[NH.CO.C$_6$H$_4$—N=N—R']$_n$

In this formula R stands for radicals of substantive components containing water-solubilizing groups, R' stands for barbituric acid or its derivatives being capable of coupling, and $n$ means 1 or 2.

The new azo dyestuffs are obtainable by coupling the diazo or tetrazo compounds of N-aminobenzoylated mononuclear or polynuclear substantive diazo components containing water-solubilizing groups with barbituric acid or its derivatives. As substantive diazo components containing solubilizing groups may be mentioned e. g. the mono- or disulfonic acids of 4,4'-diaminodiphenyl, 4,4'-diamino-3,3'-dimethyl-diphenyl or 4,4'-diamino-3,3'-dimethoxydiphenyl, 4,4'-diaminodiphenyl dicarboxylic acid, diaminodiphenyl-urea sulfonic acid, diaminodiphenyl-urea carboxylic acid, 1,4-diaminobenzene sulfonic acid, 1,4-diaminonaphthalene sulfonic acid, 1,5-diaminonaphthalene sulfonic acid, dehydrothiotoluidine sulfonic acid, 4,4'-diaminostilbene-2,2'-disulfonic acid. The aminobenzoylated substantive diazo components containing solubilizing groups, being used for this process as diazo components, can be obtained by acylating the said substantive compounds in weakly acid or alkaline solution with p- or m-nitrobenzoyl chloride and by reducing the isolated nitrobenzoylamino compounds either to the corresponding aminobenzoyl compounds or according to the process described in U. S. Patent 1,823,743 or German Patent 565,478 so that several molecules of the starting material are being connected with one another by converting two nitro groups each into an azo or azoxy group, and the nitro groups not taking part in this reaction are being reduced simultaneously to amino groups. The aminobenzoyl compounds described are either diazotized or tetrazotized depending on whether one or two diazotizable amino groups are available and coupled in sodium carbonate alkaline medium accordingly with one or two mols of barbituric acid or its derivatives capable of coupling. As coupling components all the condensation products of malonic ester with compounds such as urea, mono- or dialkyl ureas, guanidine, dicyandiamide, dicyandiamine, and others may be used.

The new dyestuffs dye cotton or fibers of regenerated cellulose in clear greenish yellow shades. The dyeings are fast to light and show a very good neutral and alkaline dischargeability.

The present invention is illustrated by the following examples without, however, being limited thereto:

Example 1

To 4.97 grams (=$\frac{1}{100}$ mol) of the sodium salt of 1,4-di-(4'-aminobenzoylamino)-naphthalene-6-sulfonic acid dissolved in 100 cc. of water 1.38 grams (=$\frac{2}{100}$ mol) of sodium nitrite are added and the mixture is acidified with 10 cc. of hydrochloric acid. Tetrazotization is carried on for one hour, and the tetrazo compound thus obtained is added to a solution containing 3.04 grams (=$\frac{2}{100}$ mol) of cyanaminobarbituric acid, 300 cc. of water and 25 grams of sodium carbonate. Thereafter the mixture is slowly heated to 60° C. while stirring, this temperature is maintained for one hour, and the disazo dyestuff is separated in the usual manner and dried. It dyes cotton in clear greenish yellow shades of good fastness to light and good dischargeability. It corresponds in the state of the free acid to the formula:

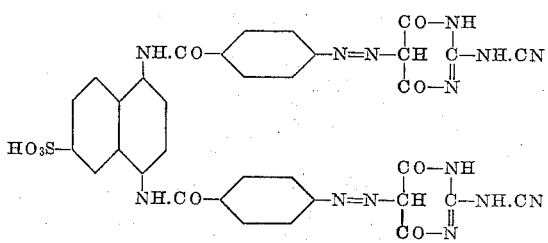

Example 2

To 5.63 grams (=$\frac{1}{100}$ mol) of the sodium salt of N-(3'-aminobenzoyl) - dehydrothiotoluidine sulfonic acid dissolved in 150 cc. of water 0.69 gram of sodium nitrite is added and the mixture is acidified with 15 cc. of hydrochloric acid. After one hour the diazo compound is run into a solution of 1.3 grams (=$\frac{1}{100}$ mol) of barbituric acid in 250 cc. of water and 30 grams of sodium carbonate. The mixture is stirred over night, and the monoazo dyestuff is isolated in the usual manner. It dyes cotton or fibers of regenerated cellulose in clear greenish yellow shades of good fastness to light and corresponds in the state of free acid to the formula:

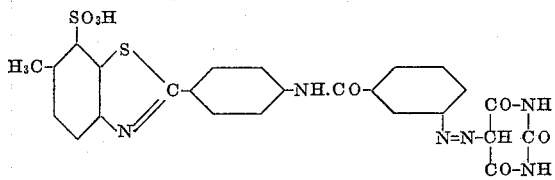

The orange-colored diazo compound is isolated, washed with some cold water, and made into a paste with water. The diazo paste is added to a quantity of cyanaminobarbituric acid corresponding to 1.1 mol—based on the quantity of nitrite having been found—in 500 cc. of water and 30 grams of sodium carbonate. The mixture obtained is slowly heated to 60° C. while stirring, and the dyestuff is isolated in the usual manner and dried. It dyes cotton in very strong greenish yellow shades which are fast to light and show a good neutral and alkaline dischargeability. The dyestuff corresponds in the state of the free acid to the formula:

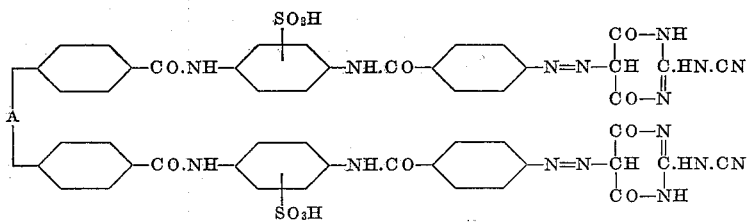

wherein A represents the azo or azoxy group.

A dyestuff of similar properties is obtained if barbituric acid is used as coupling component instead of cyanamino barbituric acid.

Example 3

To 6.84 grams (=1/100 mol) of the sodium salt of N,N'-bis-[3-sulfo-4-(3'-aminobenzoylamino)-phenyl]-urea dissolved in 250 cc. of water, 1.38 grams (=2/100 mol) of sodium nitrite are added. The mixture is thereafter acidified with 15 cc. of hydrochloric acid and tetrazotized for 2 hours. The tetrazo compound is added to a solution of 3.04 grams (=2/100 mol) of cyanaminobarbituric acid in 500 cc. of water and 30 grams of sodium carbonate and the mixture is slowly heated to 60° C. within 5 hours. The dyestuff is separated by means of sodium chloride in the usual manner, isolated and dried. It dyes cotton or fibers of regenerated cellulose in greenish yellow shades which are very fast to light and show a very good neutral and alkaline dischargeability; it corresponds in the state of the free acid to the formula:

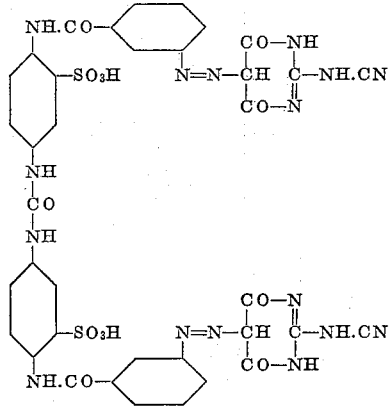

Example 4

10 grams of the 1,4-di-(4'-nitrobenzoylamino)-benzene-2-sulfonic acid are reduced according to Example 6 of U. S. Patent 1,823,743 or Example 1 of German Patent 565,478, two nitro groups being converted each into an azo or azoxy group and the nitro groups not taking part in this reaction being reduced simultaneously to amino groups; the azo and azoxy reduction product in the form of the sodium salt is well stirred with 300 c. of water, acidified with 20 cc. of hydrochloric acid, and carefully diazotized with a 10 per cent sodium nitrite solution with stirring.

Example 5

6.26 grams (=1/100 mol) of the sodium salt of 4,4'-di-(3''-aminobenzoylamino)-diphenyl-2,2'-disulfonic acid are dissolved with heating in 100 cc. of water and the solution is chilled with 200 grams of ice. Then 1.38 grams (=2/100 mol) of sodium nitrite are added and the mixture is acidified with 15 cc. of hydrochloric acid. After 2 hours the tetrazo compound is added to a solution of 2.6 grams (=2/100 mol) of barbituric acid in 300 cc. of water and 30 grams of sodium carbonate, and the mixture is stirred over night. The dyestuff isolated in the usual manner dyes viscose rayon in clear greenish yellow shades of a very good dischargeability; it corresponds in the state of the free acid to the formula:

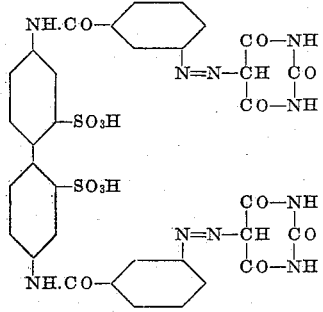
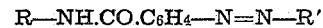

I claim:
1. Azo dyestuffs of the general formula:

R—[NH.CO.C6H4—N=N—R']n wherein R stands for the radical of a substantive component selected from the group consisting of components of the benzene series, diamines of the naphthalene series and amines of phenyl benzthiazoles containing water-solubilizing groups, R' stands for a barbituric acid radical, and n stands for one of the integers 1 and 2.

2. Azo dyestuffs of the general formula:

R—NH.CO.C6H4—N=N—R' wherein R stands for the radical of a substantive component selected from the group consisting of components of the benzene series, diamines of the naphthalene series and amines of phenyl benzthiazoles containing water-solubilizing groups and R' stands for a barbituric acid radical.

3. Azo dyestuffs of the general formula:

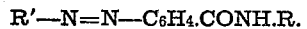
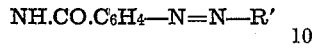

R'—N=N—C₆H₄.CONH.R.
NH.CO.C₆H₄—N=N—R' wherein R stands for the radical of a substantive component selected from the group consisting of components of the benzene series, diamines of the naphthalene series and amines of phenyl benzthiazoles containing water-solubilizing groups and R' stands for a barbituric acid radical.

4. Azo dyestuffs of the general formula:

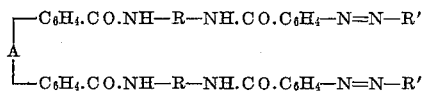

—C₆H₄.CO.NH—R—NH.CO.C₆H₄—N=N—R'
A
—C₆H₄.CO.NH—R—NH.CO.C₆H₄—N=N—R' wherein R stands for the radical of a substantive component selected from the group consisting of components of the benzene series, diamines of the naphthalene series and amines of phenyl benzthiazoles containing water-solubilizing groups, R' stands for a barbituric acid radical and A represents a member of the class consisting of azo and azoxy groups.

5. The azo dyestuff of the formula:

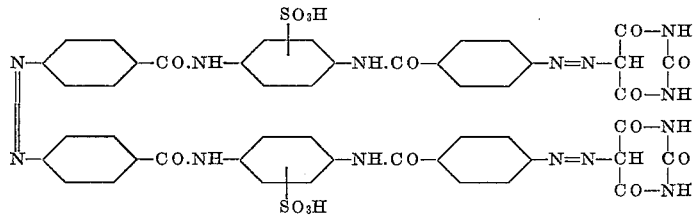

6. The azo dyestuff of the formula:

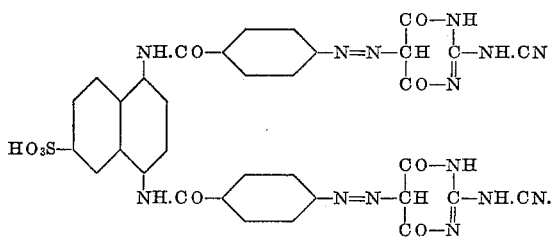

7. The azo dyestuff of the formula:

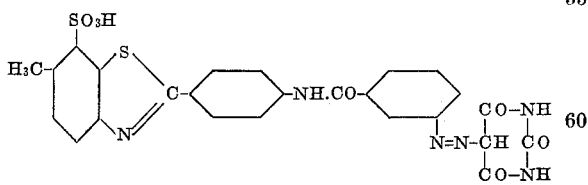

8. The azo dyestuff of the formula:

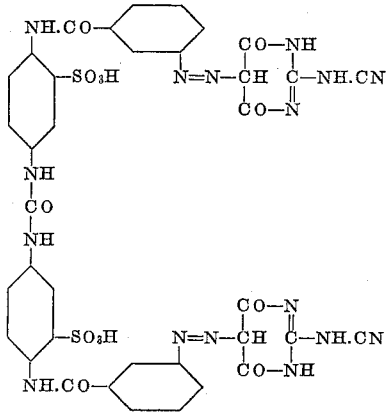

9. The azo dyestuff of the formula:

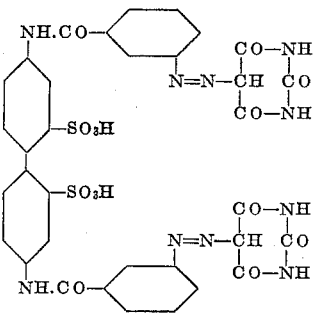

10. The dyestuff of claim 1 wherein R stands for the radical of a substantive component of the benzene series and n is 2.

11. The dyestuff of claim 1 wherein R stands for the radical of a substantive component of the naphthalene series and n is 2.

References Cited in the file of this patent

UNITED STATES PATENTS

| Number | Name | Date |
|---|---|---|
| 1,823,743 | Kalischer et al. | Sept. 15, 1931 |
| 2,283,220 | McNally et al. | May 19, 1942 |